US009135492B2

(12) United States Patent
Gellaboina et al.

(10) Patent No.: US 9,135,492 B2
(45) Date of Patent: Sep. 15, 2015

(54) IMAGE BASED DIAL GAUGE READING (75) Inventors: Mahesh K. Gellaboina, Andhra Pradesh (IN); Gurumurthy Swaminathan, Bangalore (IN); Vijendran G. Venkoparao, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 983 days.

(21) Appl. No.: 13/237,147

(22) Filed: Sep. 20, 2011

(65) Prior Publication Data
US 2013/0070099 A1    Mar. 21, 2013

(51) Int. Cl.
H04N 7/18       (2006.01)
G06K 9/46      (2006.01)
G06K 9/00      (2006.01)

(52) U.S. Cl.
CPC .............. *G06K 9/00* (2013.01); *G06K 2209/03* (2013.01)

(58) Field of Classification Search
CPC ....................................................... G10D 5/39
See application file for complete search history.

(56) References Cited

U.S. PATENT DOCUMENTS

| 5,807,245 A * | 9/1998 | Aldestam et al. ............. 600/300 |
| 7,940,604 B2 * | 5/2011 | Inoue et al. ..................... 368/80 |
| 7,970,604 B2 | 6/2011 | Johnston et al. |
| 2008/0148877 A1 | 6/2008 | Sim |

OTHER PUBLICATIONS

Lima et al. "A computer vision system to read meter displays" 16th IMEKO TC4 Symposium Exploring New Frontier of Instrumentation and Methods for Electrical and Electronic Measurements, Sep. 22-24, 2008.*
Biemond, J., et al., "Iterative methods for image deblurring", Proceedings of the IEEE, 78(5), (1990), 856-883.
Kundur, D., et al., "Blind Image Deconvolution", IEEE Signal Processing Magazine, 13(3), (1996), 43-64.

* cited by examiner

*Primary Examiner* — Sath V Perungavoor
*Assistant Examiner* — Kate Luo
(74) *Attorney, Agent, or Firm* — Schwegman Lundberg & Woessner, P.A.

(57) ABSTRACT

A system and method include obtaining an image of an analog dial gauge. The image is processed to identify an endpoint of the gauge and a needle position in the image. A reading of the gauge is determined from the endpoint, the needle position, and information regarding the range of the gauge.

17 Claims, 8 Drawing Sheets

IMAGE BASED DIAL GAUGE READING

BACKGROUND

In industrial plants there are many analog dial gauges used for monitoring pressure and temperature of various equipments. An operator is employed to monitor and record the readings of these gauges. The operators are typically required to note down the readings of the dial gauges multiple times in a day. They go to the place where the dial gauge is present and note down the readings on a handheld device.

SUMMARY

A system and method include obtaining an image of an analog dial gauge. The image is processed to identify a start point of the gauge and a needle position in the image. A reading of the gauge is determined from the start point, end point, the needle position, and information regarding the range of the gauge.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
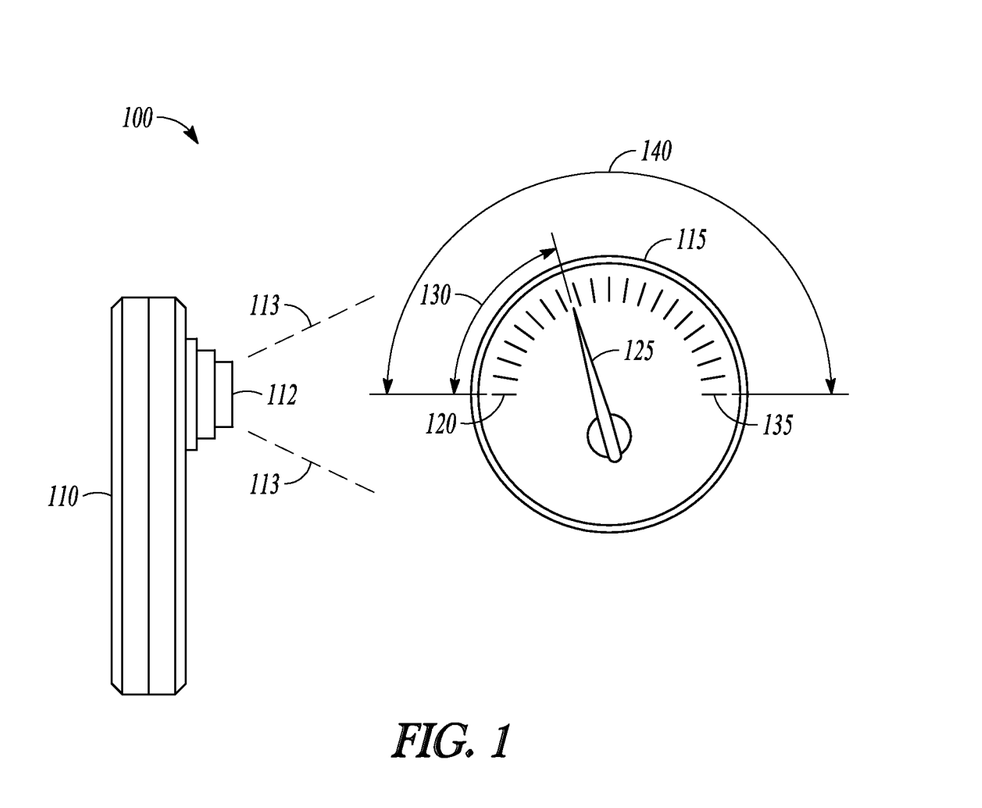
FIG. 1 is a block diagram of a handheld image acquisition device to obtain an image of a dial gauge according to an example embodiment.

In various embodiments, one of which is illustrated at 100 in FIG. 1, an operator uses a mobile device 110 with a camera 112 to obtain an image represented by lines 113 of a dial gauge 115. An edge detector is used to detect edges in the image. Using dial gauge properties, a circle around the dial gauge 115 may be identified. Since an operator can take the image from varying distances, the size of the image may vary significantly. While a Hough transform may be used to detect the circles at multiple scales, it is time consuming. In one embodiment, a correlation based method is used to detect the circle.

Since a circle has a property such that its shape does not change if the image is rotated, this property may be used to detect the circle on the edge of the image. Once the circle is detected, the region that is inside the circle is identified, analysis is performed on the identified region.

In one embodiment, the image of the circle is converted to polar domain, where the readings on the dial gauge appear like a scale in the polar domain. Column projection of the polar images gives the start position 120 of the reading and the position of a needle 125 in the dial gauge 115. The distance between the start position and needle position in the polar image gives the angle 130 between the start position 120 and needle position 125. Knowing the maximum 135 and minimum or start 120, readings on the dial gauge 115 and also the angle 140 between the start 120 and end 135 positions of the readings (from dial gauge specifications), the current reading of the dial gauge 115 is obtained using the angle 130 between the start position and the needle position.

In some industrial plants, an operator may use a hand held device 110 to record readings from dial gages. The handheld device may be highly sophisticated with various sensors such as GPS, barcode readers and camera 112. The handheld device 110 in one embodiment stores and runs an application to use the handheld device to capture the image of the analog dial gauge, digitize it automatically and store it in the device. In some embodiments, the captured image may be sent to another device for processing and storage. Use of the handheld device 110 helps in obtaining the reading of the dial gauge automatically and also may have a memory device to store the image of the dial gauge as visual evidence.

Computing a digital reading from the image of analog dial gauge reader captured using an optical device may be used to reduce the amount of time previously spent by operators in the field. In one embodiment, an electricity bill may be generated by after an operator uses a handheld device to obtain a meter reading. The risk of noting the reading wrongly is mitigated by providing a camera to the handheld device thereby operator can take the picture of the meter and the meter reading is automatically extracted from the image and bill is generated.

Figure 2:
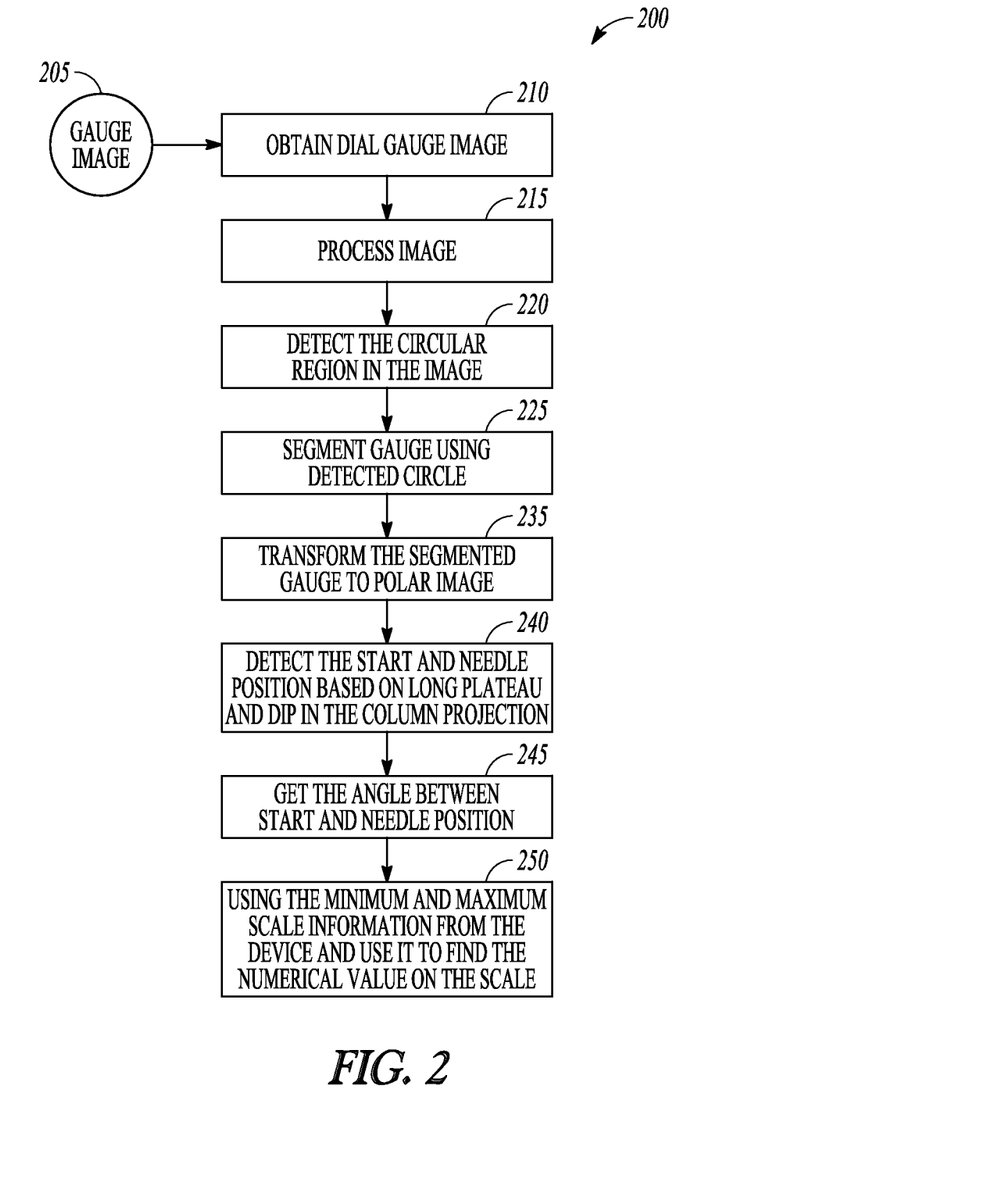
FIG. 2 is a block flow diagram of a method of using an image to obtain a dial gauge reading according to an example embodiment.

An overview of a method 200 of obtaining a digital value of a gauge utilizing an image of the gauge is illustrated in flowchart form in FIG. 2. An image 205 of the gauge is obtained at 210, such as by the use of a camera in a handheld device. The device may be a networked device, such as a smart phone. The image may be preprocessed at 215 to detect edges in the window and the image can be resized if needed. At 220, a circle in the image is detected based on the edges that are detected. At 230, the image of the gauge is segmented using the detected circle. The dial gauge is transformed at 235 to a polar image. A column projection of the polar image is used at 240 to identify the needle and start positions based on a column plateau and dip in the column projection. At 245, the angle between the start and needle position is obtained, and at 250, minimum and maximum scale information for the device is obtained and used to find the numerical value on the scale corresponding to the needle position. The reading of the gauge in one embodiment, may be determined utilizing the needle position and gauge start position compared to a total distance in the polar image between the start point and end point of the gauge and information about the scale of the gauge.

The total distance and scale information may be obtained from a database of gauges based on an identity of the gauge being imaged. In some embodiments, the gauge may have a bar code or QR code that may be seen in the image of the gauge from which the identity of the gauge can be obtained. The operator may enter an ID in other embodiments, or location mechanisms such as GPS functionality in the handheld device may be used to identify a location of the gauge. The databases may be used with any of this information to identify information to assist in the recognition and digitization of the reading of the gauge.

Figure 3:
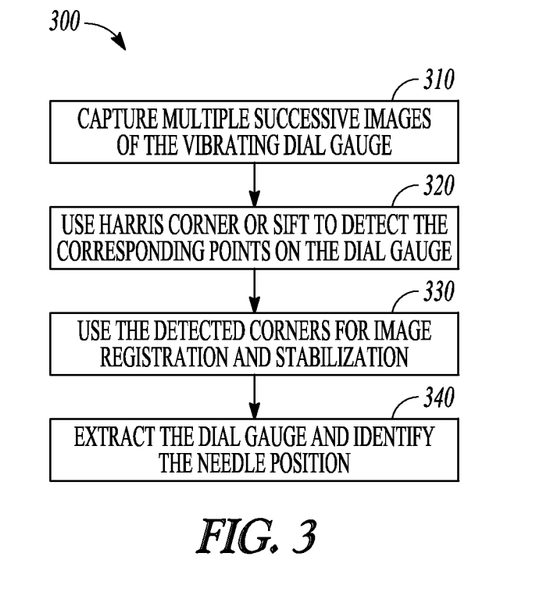
FIG. 3 is a block flow diagram of a method of using an image to obtain a vibrating dial gauge reading according to an example embodiment.

FIG. 3 is a block flow diagram of a method 300 of using an image to obtain a vibrating dial gauge reading according to an example embodiment. In one embodiment, accurate readings of the gauge may be obtained while it is vibrating (such as from gauges that are installed on a vibrating platform). In some embodiment, automatic gauge reading may utilize video analytics, where the hand held device captures a digital video of the gauge.

In one embodiment, image stabilization operates to obtain a sequence of images from the vibrating dial gauge. At 310, 10 successive images of the vibrating dial gauge are captured. Harris corner or SIFT may be used at 320 to detect the corresponding points on the dial gauge. Since only the dial gauge is moving with respect to a background part of the image, corners may be detected at 330 for image registration and stabilization. At 340, the dial gauge is extracted from the image and the needle position is identified from each dial gauge.

Figure 4:
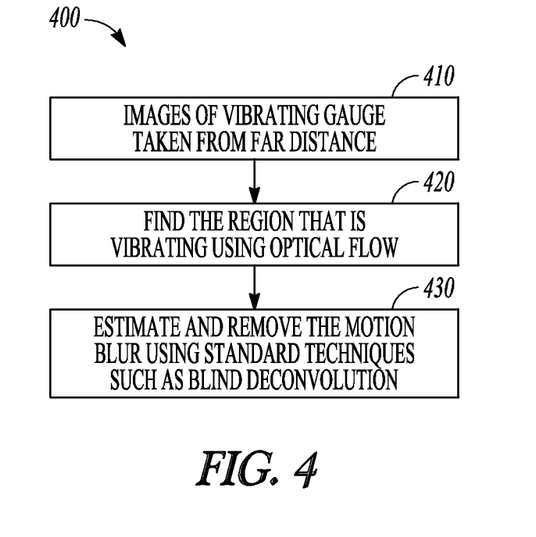
FIG. 4 is a block flow diagram of a method of using a blurry image to obtain a dial gauge reading according to an example embodiment.

FIG. 4 is a block flow diagram of a method 400 of using a blurry image to obtain a dial gauge reading according to an example embodiment. In the case of motion blur, motion blur estimation (point spread function) methods may be used to remove the blur from the image. At 410, images of vibrating gauge taken from a far distance (less than 10 m for example). The region that is vibrating is found starting at 420 using optical flow. At 430, the motion blur is estimated and removed using standard image processing techniques such as blind deconvolution.

Method 200 may then be used to get the digital reading from the image. In one embodiment, the methods described herein may be targeted as a lightweight solution for the handhelds, where an operator take the snapshot and the handheld device provides digitized alphanumeric. This device and methods may be integrated with most of the SCADA (supervisory control and data acquisition) solutions.

Figure 5:
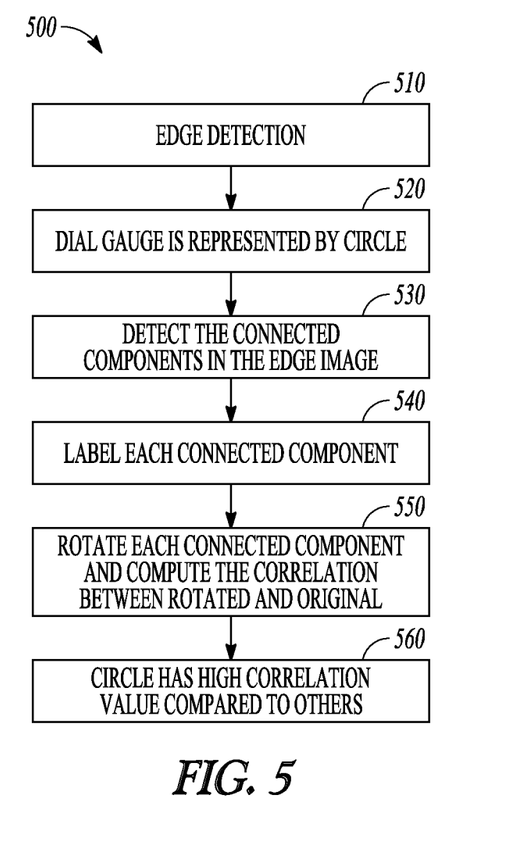
FIG. 5 is a block flow diagram of a method of detecting edges and a circle of a dial gauge image according to an example embodiment.

FIG. 5 is a block flow diagram of a method of detecting edges and a circle of a dial gauge image according to an example embodiment. Image normalization and edge detection are first performed. Photometric normalization and edge detection are first performed at 510. At 520, the dial gauge is represented by a circle. Circle detection is performed starting at 530 by detecting connected components in the edge image. Each connected component is labeled at 540. At 550, each connected component is rotated and the correlation between rotated and original components is computed. At 560, the circle has a high correlation value compared to other shapes. Also, the ratio of the edge pixels to non-edge pixels is low for a circle compared to other shapes. This factor is also used to eliminate non-circles after filtering using correlation method. Method 500 may be applied to detect a circle with any radius.

Figure 6:
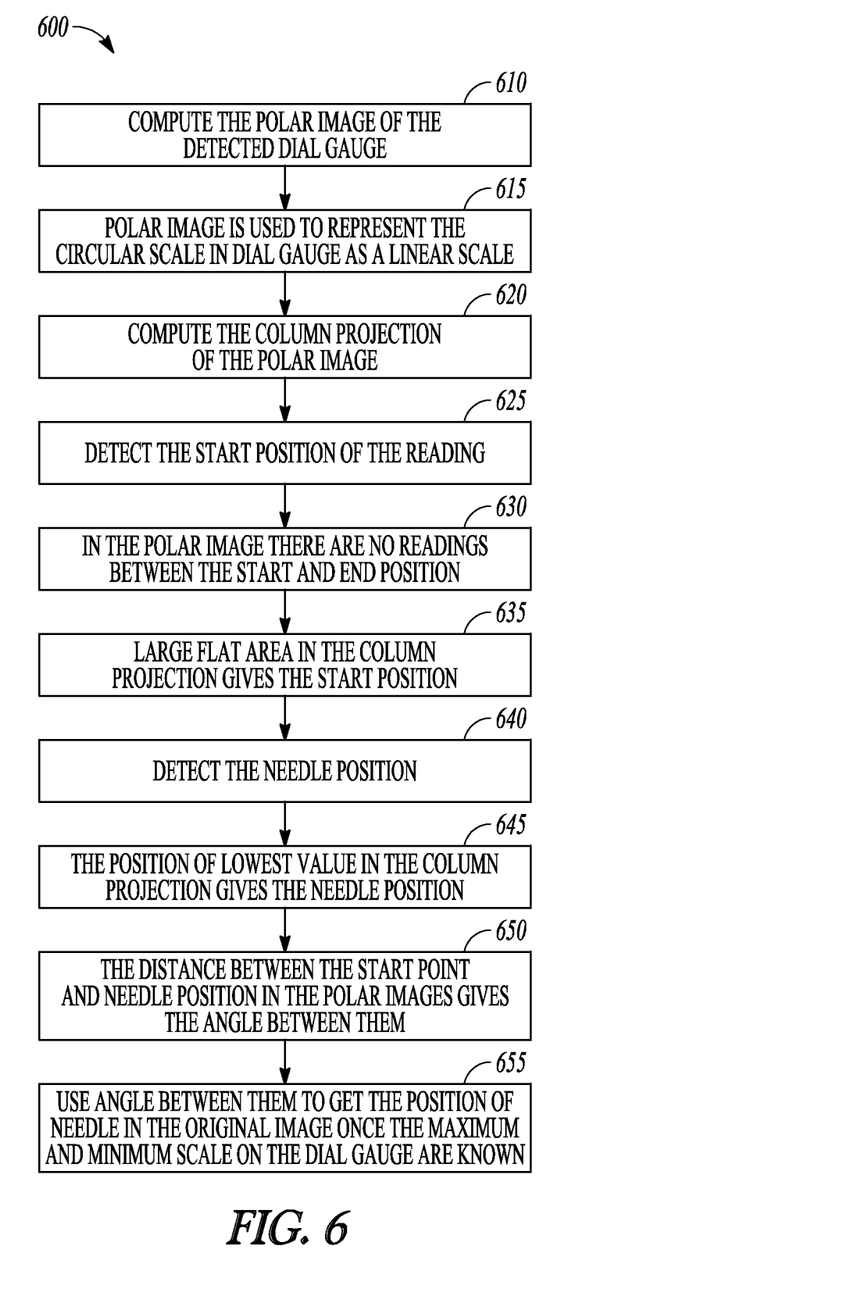
FIG. 6 is a block flow diagram of a method computing a polar image and recognizing start and stop gauge positions according to an example embodiment.

FIG. 6 is a block flow diagram of a method 600 that computes a polar image and recognizes start and stop gauge positions according to an example embodiment. At 610, the polar image of the detected dial gauge is computed. The polar image is used at 615 to represent the circular scale in dial gauge as a linear scale. At 620, the column projection of the polar image is computed. The start position of the reading is detected at 625. In the polar image in one embodiment, flat area in the column projection gives the start position at 635. At 640, the needle position is detected. The position of lowest value in the column projection gives the needle position at 645. The distance between the start point and needle position in the polar image gives the angle between them at 650. At 655, the angle between them is used to get the position of needle in the original image once the maximum and minimum scale on the dial gauge are known.

Figure 7:
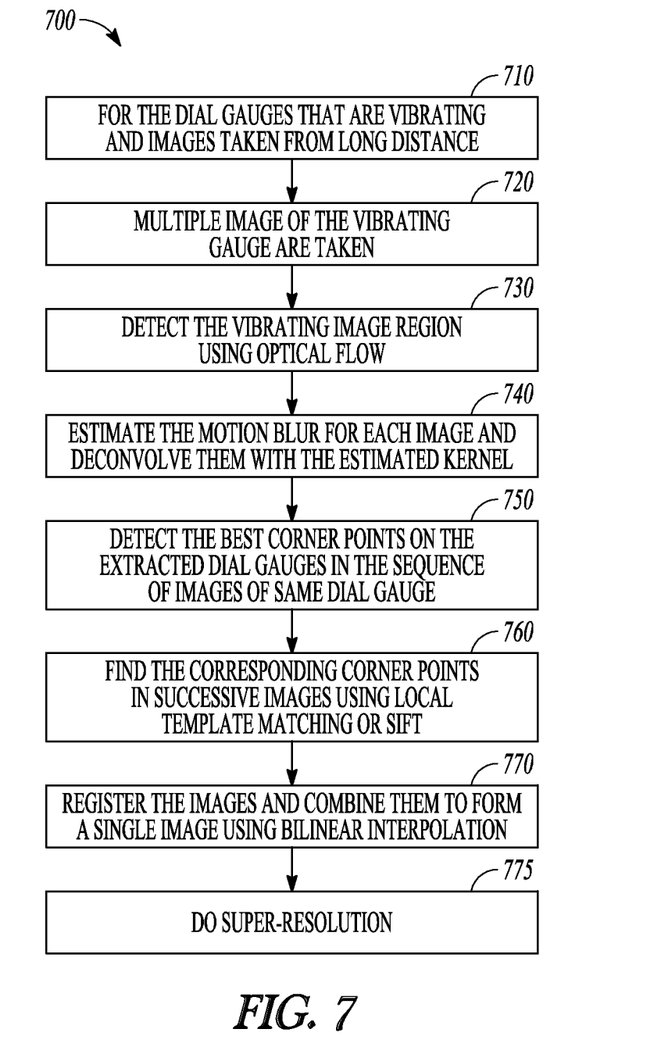
FIG. 7 is a block flow diagram of an alternative method of using a vibrating image to obtain a dial gauge reading according to an example embodiment.

FIG. 7 is a block flow diagram of an alternative method 800 of using a vibrating image to obtain a dial gauge reading according to an example embodiment. For the dial gauges that are vibrating and images may be taken from a close distance, such as one to two meters or less. Motion blur (space variant) estimation techniques are used to remove the blur, and the image may be processed as above. For the dial gauges that are vibrating and images taken from a long distance as indicated at 710, multiple images of the vibrating gauge are taken. The vibrating image region is detected at 720 using optical flow. At 740, the motion blur for each image is estimated and is de-convolved with the estimated kernel. At 750, the best corner points on the extracted dial gauges in the sequence of images of same dial gauge are detected. The corresponding corner points in successive images are found at 760 using local template matching or SIFT. The images are registered at 770 and combined to form a single image using bilinear interpolation. An alternative is to use super-resolution to improve the resolution of the image by using the bilinear interpolation image as an initial estimate.

Figure 8:
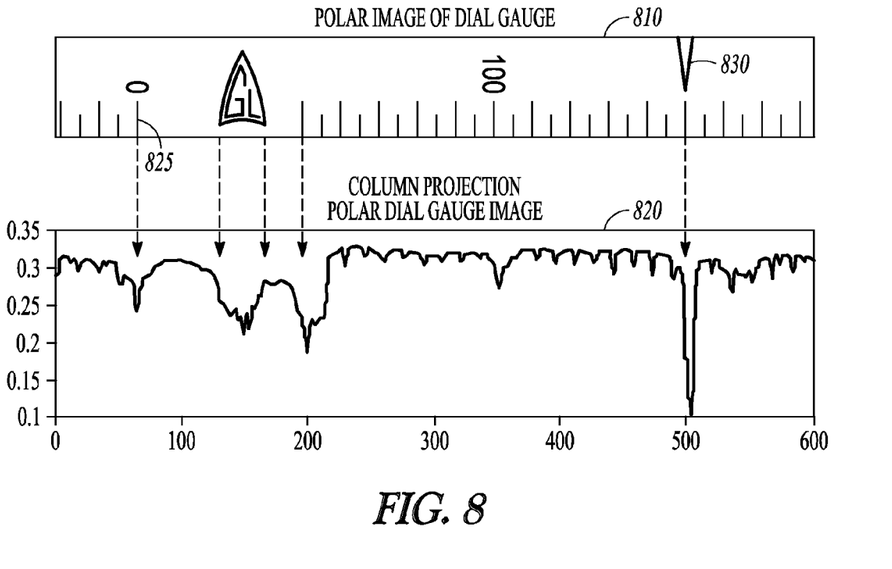
FIG. 8 is a diagram of a polar image and column projection image according to an example embodiment.

FIG. 8 is a representation of a polar image of a dial gauge at 810 with a corresponding column projection polar dial gauge image 820. The start position is identified at 825, and needle position at 830.

Figure 9:
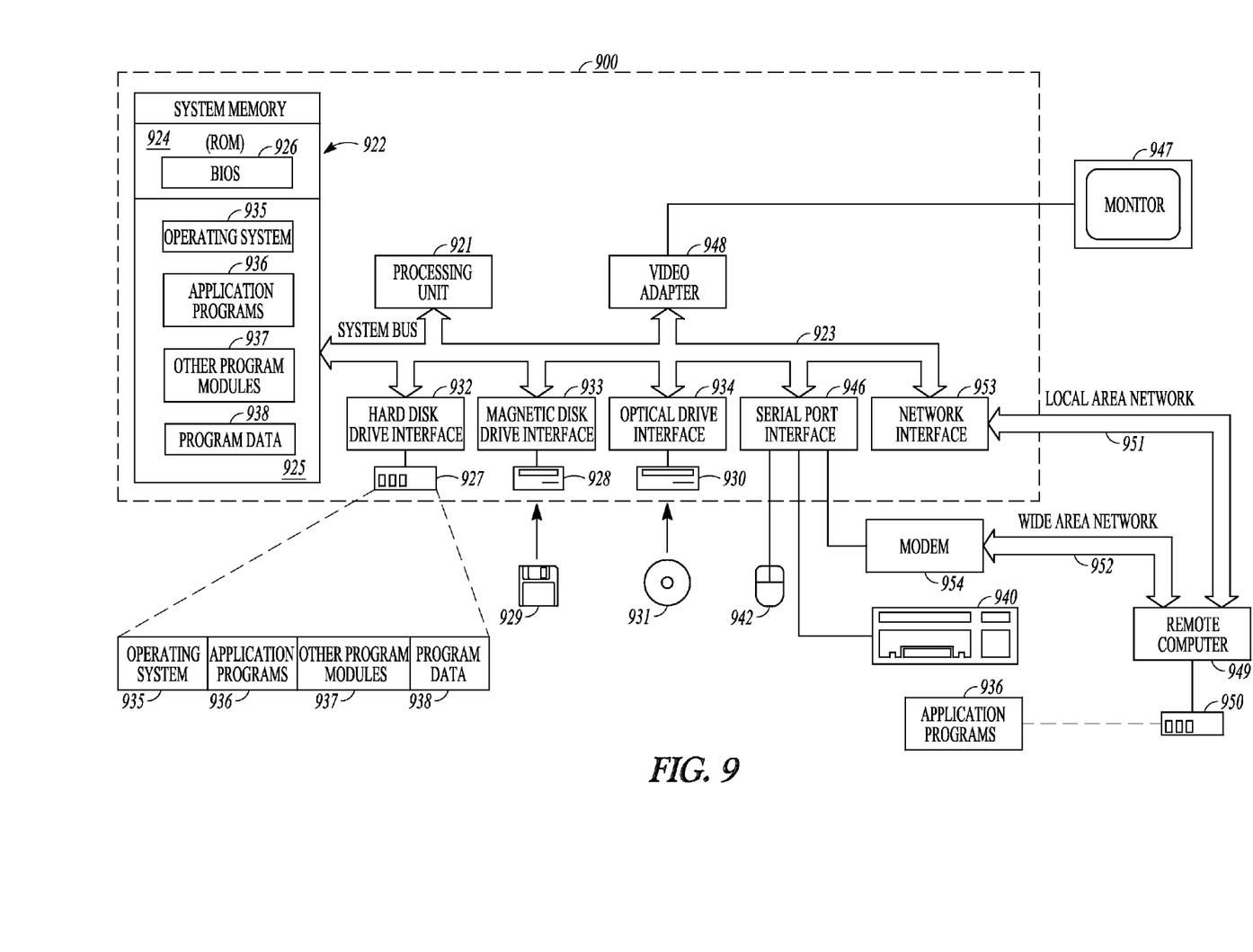
FIG. 9 is a block diagram of a computer system for performing one or more methods and algorithms according to an example embodiment.

FIG. 9 is a block diagram of a computer system to implement methods according to an example embodiment. In the embodiment shown in FIG. 9, a hardware and operating environment is provided that is applicable to hand held devices and servers and/or remote computers. Not all the components in FIG. 9 need to be used to implement the methods and devices in various embodiments.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; the invention is not limited to a particular type of communications device. The remote computer 949 can be another computer, a server, a router, a network PC, a client, a peer device or other common network node, and typically includes many or all of the elements described above I/0 relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   obtaining an image of an analog dial gauge;
   processing the image to identify an endpoint of the gauge and a needle position in the image;
   determining a reading of the gauge from the endpoint, the needle position, and information regarding the range of the gauge; and
   wherein processing the image comprises:
      detecting a circular region in the image corresponding to a face of the gauge;
      converting the circular region into a polar image;
      detecting the start and needle positions from the polar image;
      obtaining a distance between the start and needle positions; and
      using the distance and scale information to provide a digital value representative of the reading of the gauge.

2. The method of claim 1 and further comprising obtaining the range of the gauge from a database.

3. The method of claim 1 and further comprising obtaining the image of the dial gauge via a mobile device having a camera.

4. The method of claim 1 wherein the image and determined reading are stored.

5. The method of claim 4 wherein detecting a circular region in the image comprises:
   detecting edges in the image;

detecting connected components in the edges;
rotating the connected components and correlate between the rotated and edges in the original image; and
identifying the circle by using highest correlated connected components.

6. The method of claim 1 wherein for a vibrating dial gauge, multiple images are obtained, motion blur for each image is estimated, best corner points are detected, corresponding corner points in each image are found, and the images are registered and combined to form a single image.

7. The method of claim 6 wherein estimating the motion blur includes de-convolving the images.

8. The method of claim 1 wherein processing the image for a vibrating gauge comprises:
capturing multiple successive images of the dial gauge;
detecting corresponding points on the dial gauge images to perform stabilization;
finding corner features within the dial gauge region; and
extracting the dial gauge from the images.

9. A non-transitory computer readable storage device having instructions for causing a computer to execute a method, the method comprising:
obtaining an image of an analog dial gauge;
processing the image to identify an endpoint of the gauge and a needle position in the image;
determining a reading of the gauge from the endpoint, the needle position, and information regarding the range of the gauge; and
wherein processing the image comprises:
detecting a circular region in the image corresponding to a face of the gauge;
converting the circular region into a polar image;
detecting the start and needle positions from the polar image;
obtaining a distance between the start and needle positions; and
using the distance and scale information to provide a digital value representative of the reading of the gauge.

10. The non-transitory computer readable storage device of claim 9 wherein the method further comprises obtaining the range of the gauge from a database.

11. The non-transitory computer readable storage device of claim 9 wherein the method further comprises obtaining the image of the dial gauge via a mobile device having a camera.

12. The non-transitory computer readable storage device of claim 9 wherein the image and determined reading are stored on the mobile device.

13. The non-transitory computer readable storage device of claim 9 wherein detecting a circular region in the image comprises:
detecting edges in the image;
detecting connected components in the edges;
rotating the connected components and correlate between the rotated and edges in the original image; and
identifying the circle by using highest correlated connected components.

14. The non-transitory computer readable storage device of claim 9 wherein processing the image for a vibrating gauge comprises:
capturing multiple successive images of the dial gauge;
detecting corresponding points on the dial gauge images to perform stabilization;
finding corner features within the dial gauge region; and
extracting the dial gauge from the images.

15. A mobile device comprising:
a camera to take images of an analog dial of a gauge;
a processor to process the image to identify an endpoint of the gauge and a needle position in the image; and
wherein the processor executes code to determine a reading of the gauge from the endpoint, the needle position, and information regarding the range of the gauge; and
wherein the processor further executes code to:
detect a circular region in the image corresponding to a face of the gauge;
convert the circular region into a polar image;
detect the start and needle positions from the polar image;
obtain a distance between the start and needle positions; and
use the distance and scale information to provide a digital value representative of the reading of the gauge.

16. The device of claim 15 and further comprising a wireless component to obtain the information regarding the range of the gauge.

17. The device of claim 15 wherein the processor further executes code to detect a circular region in the image by:
detecting edges in the image;
detecting connected components in the edges;
rotating the connected components and correlate between the rotated and edges in the original image; and
identifying the circle by using highest correlated connected components.

* * * * *